April 25, 1933.   R. W. BARRETT   1,905,333
ANTIFRICTION EQUALIZING BEARING
Filed July 14, 1930   3 Sheets-Sheet 1
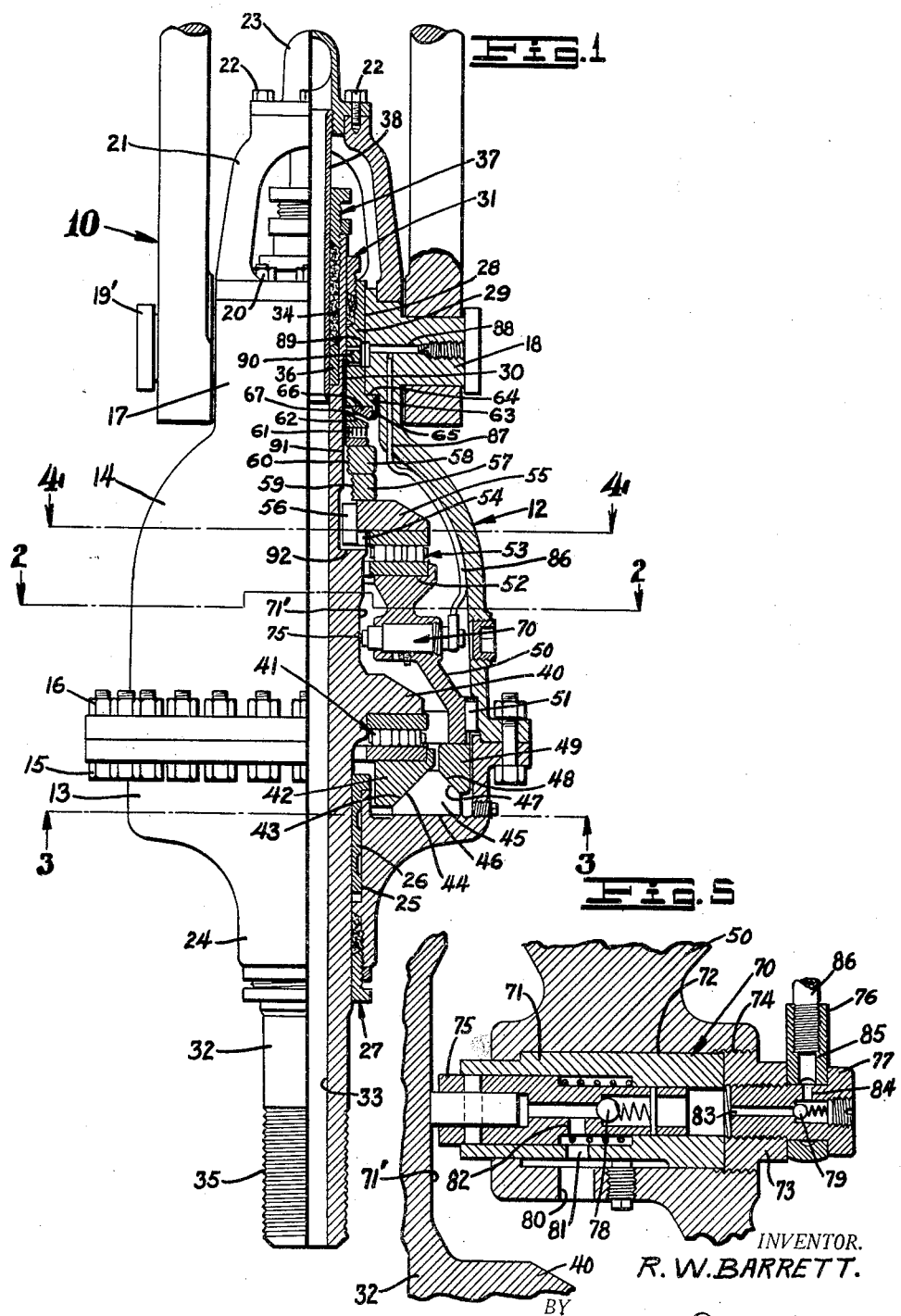
INVENTOR.
R. W. BARRETT.
BY
ATTORNEY.

April 25, 1933.  R. W BARRETT  1,905,333
ANTIFRICTION EQUALIZING BEARING
Filed July 14, 1930   3 Sheets-Sheet 2
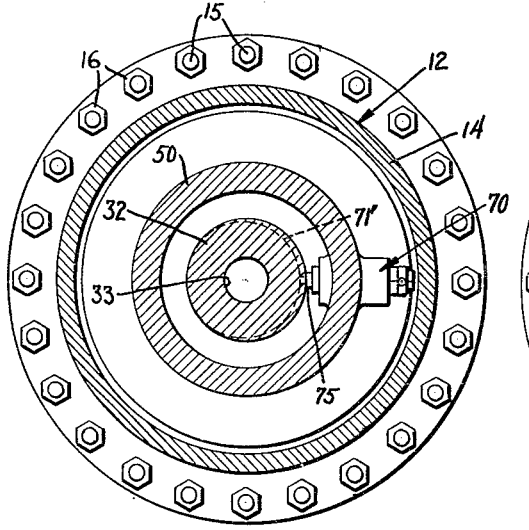
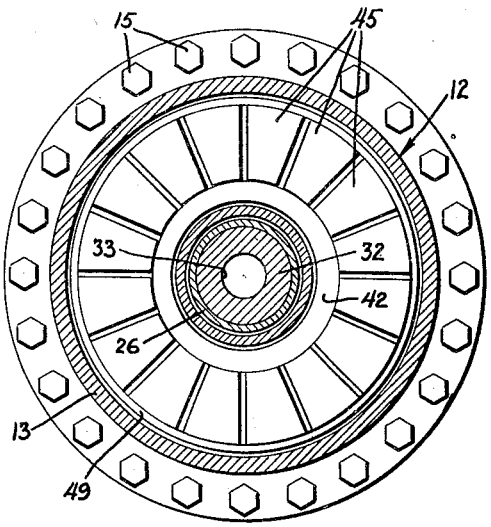
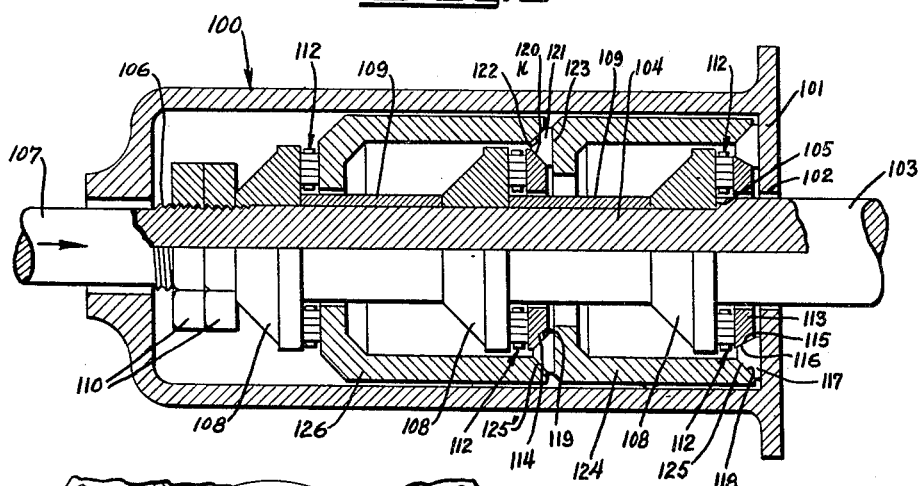
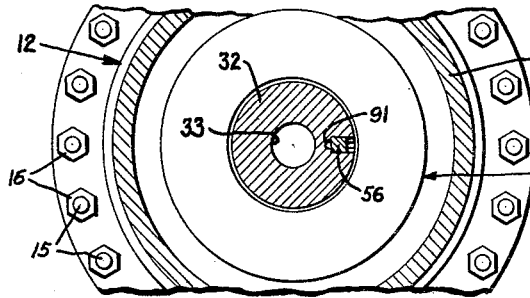
INVENTOR.
R. W. BARRETT.
BY
ATTORNEY.

April 25, 1933.    R. W. BARRETT    1,905,333
ANTIFRICTION EQUALIZING BEARING
Filed July 14, 1930    3 Sheets-Sheet 3

INVENTOR.
R. W. BARRETT.
BY
ATTORNEY.

Patented Apr. 25, 1933

1,905,333

UNITED STATES PATENT OFFICE

RAY W. BARRETT, OF TORRANCE, CALIFORNIA

ANTIFRICTION EQUALIZING BEARING

Application filed July 14, 1930. Serial No. 467,853.

This invention relates to improvements in well drilling swivels.

The general object of the invention is to provide an improved swivel including a novel bearing.

Another object of the invention is to provide a swivel including a novel means for lubricating the working parts thereof.

An additional object is to provide an improved thrust bearing.

A further object of my invention is to provide a bearing including balanced antifriction members.

Other objects and the advantages of this invention will be apparent from the following description taken in connection with the accompanying drawings wherein:

Fig. 1 is an elevation of my improved swivel partly in section.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 is an enlarged fragmentary section of the swivel showing the construction of the lubricating pump.

Fig. 6 is a longitudinal section through a modified form of bearing member.

Figure 7:
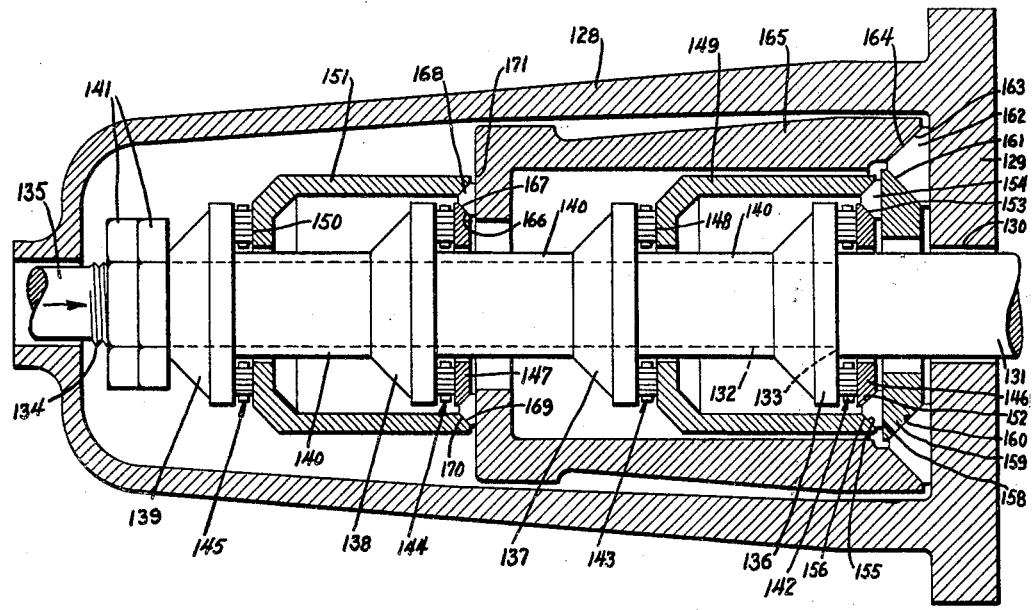
Fig. 7 is a similar view of a further modification of the bearing.

Referring to the drawings by reference characters I have indicated my improved swivel generally at 10. As shown this swivel comprises a housing 12 which includes a lower portion 13 having an upper portion 14 secured thereto by bolts 15 and nuts 16. The upper portion 14 includes a reduced neck 17 having opposed trunnions 18 thereon on which a bail 19 is mounted and which is retained in position thereon by cap screws 19'. Secured to the neck 17 as by bolts 20 I provide a bracket 21 which has secured thereto by bolts 22 the ordinary goose-neck inlet fitting 23.

The lower portion 13 includes a reduced neck 24 which is provided with an aperture 25 having a bearing bushing 26 therein and adjacent the lower end of the neck 24 a packing gland 27. The neck 17 is provided with an aperture 28 in which a bearing block 29 is positioned. The bearing block is provided with an aperture 30 having a packing gland 31 adjacent the upper end thereof.

Positioned in the housing 12 I provide a shaft 32 which extends upwardly through the bearing block aperture 30 and the packing gland 31 and downwardly through the bearing bushing 26 and the packing gland 27. The shaft 32 is provided with an axial aperture 33 adjacent the upper end of which I provide a recess 34. The lower portion of the shaft is externally threaded as at 35 for securing thereto the drilling sub. Positioned in the recess 34 adjacent the lower end thereof I provide a bushing 36 and adjacent the upper end I provide a packing gland 37.

The goose neck 23 has a sleeve 38 secured thereto as by threaded engagement. This sleeve 38 extends downward through the packing gland 37 and the bushing 36 into the aperture 33 of the shaft 32, thus forming a conduit from the goose neck into the shaft.

Intermediate the length of the shaft 32 I provide an enlarged flange 40 which is adapted to rest on the upper raceway of an antifriction bearing 41 which is shown as of the roller bearing type. The lower raceway of the bearing 41 is adapted to be supported by a ring 42 which includes an inclined angular face 43. This face 43 engages the inner angular faces 44 of a plurality of segments 45 arranged in annular formation and supported on a bearing surface 46 provided in the bottom member 13 (see Figs. 1 and 3). The segments 45 also include outer angular faces 47 which are adapted to be engaged by an angular inner surface 48 of a ring 49.

Mounted on the ring 49 I provide an annular floating collar or bracket 50 which is secured to the housing by a key 51 and extends upwardly to a point above the enlarged flange 40 of the shaft 32 where it is provided with a bearing supporting surface 52 on which an antifriction bearing 53 of the roller bearing type is mounted.

Mounted on a flange 54 integral with the shaft 32 I provide a ring 55 which is secured to the shaft by a key 56 and is adapted to be retained in engagement with the upper raceway of the bearing 53 by nuts 57 and 58 mounted on threaded portions 59 and 60 of the shaft 32.

Positioned on the nut 58 I provide an anti-friction bearing 61 of the roller bearing type the upper surface of the upper raceway of which is tapered as indicated at 62.

The bearing block 29 is provided with an enlarged flange 63 which is adapted to engage the under face of a shoulder 64 provided in the neck 17 and which includes a recess 65 having a ring 66 therein provided with a tapered surface 67 to match the tapered surface 62 of the bearing 61 which is normally spaced from the tapered surface 67 of the ring as shown in Fig. 1.

On the bracket or floating collar 50 I provide a lubricating pump which is indicated generally at 70 and shown in detail in Fig. 5. Any suitable type of plunger pump may be used but as shown the pump 70 includes a barrel 71 positioned in an aperture 72 in the bracket 50 and retained in position by a threaded cap 73 engaging threads 74 in the bracket. This pump includes a spring pressed hollow plunger 75 and an outlet fitting 76 secured to the cap 73 by a bolt 77, and a check valve 78 in the plunger and a check valve 79 in the bolt 77.

For operating the pump 70 I provide a cam portion 71' on the shaft 32 which is adapted to be engaged by the pump plunger 75 and as the shaft 32 rotates the cam portion 71' causes the plunger 75 to reciprocate (see Figs. 2 and 3).

In operation the housing 12 is filled with a lubricating fluid and as the plunger is reciprocated in the barrel the fluid enters the pump through an aperture 80 provided in the bracket 50 and passes through an aperture 81 in the barrel and an aperture 82 in the plunger into the plunger. Thence past the check valve 78 into the barrel and through an aperture 83 in the bolt 77, past the check valve 79 and out through an aperture 84 in the bolt and an aperture 85 in the fitting 76 into a pipe 86.

The pipe 86 extends upwardly and a portion thereof is positioned in an aperture 87 in the upper portion 14 of the housing which communicates with an aperture 88 provided in one of the trunnions 18. The aperture 88 communicates with a chamber 89 formed partly in the neck 17 and partly in the bearing block 29 and extending from the chamber 89 to the aperture 30 of the bearing block I provide apertures 90. One of the apertures 90 communicates with a groove 91 provided in the shaft 32 and which extends downward past the key 56 where it communicates with a groove 92 extending outwardly to direct the lubricating fluid towards the bearing 53.

When the device 10 is operatively installed in a well derrick and the drill string is suspended from the shaft 32 the weight is transferred from the shaft 32 through the flange 40 to the bearing 41 and the ring 55 to the bearing 53. From the bearing 41 the weight is transferred through the ring 42 to the segments 45 and from the bearing 53 the weight is transferred through the bracket 50 and the ring 49 to the segments 45.

With the ordinary type of bearing supporting arrangements it is very hard to apply an equal pressure on all the bearings when more than one bearing is employed to support a single element, but with my improved construction the weight on both bearing members is the same.

As weight is applied to the shaft 32 the ring 42 tends to force the segments 45 outward but as pressure is applied at the same time to the bearing 53 the ring 49 tends to force the segments 45 inward thereby tending to equalize or balance the outward pressure on the segments and thus distributing the weight between the bearings 41 and 53.

When the weight of the drilling string is supported by means other than the swivel 10 and the swivel is supported by the drill string the upper raceway of the bearing 61 contacts with the bearing ring 66 thereby supporting the weight of the housing 12 on the shaft 32.

Although I have shown and described my improved equalizing bearing arrangement in connection with a swivel it will be readily understood that it may be used in connection with any other device.

Figure 8:
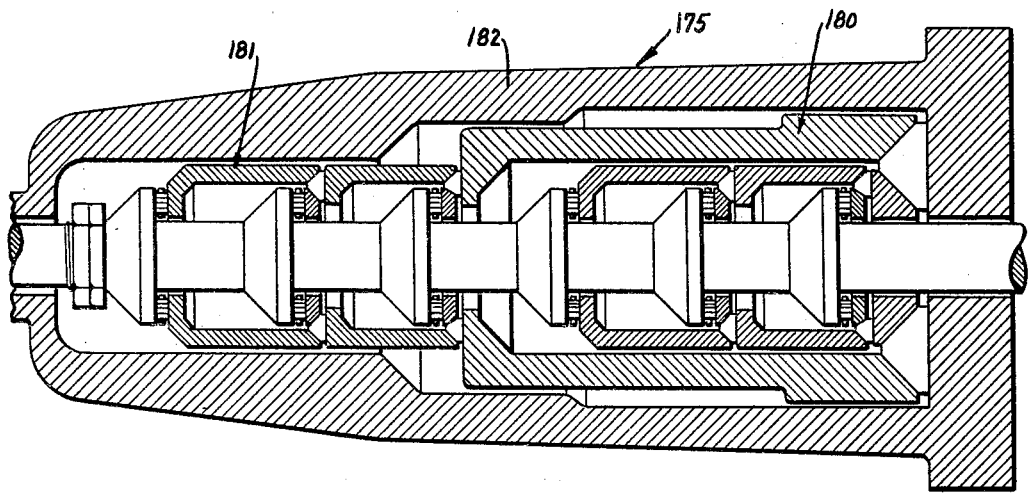
Fig. 8 is a similar view of a still further modification of the bearing.

In Figs. 6, 7 and 8 I have shown modified forms of my improved equalizing bearing wherein the bearings are adapted to bear the thrust of horizontal shafts, although similar constructions may be used in connection with vertical shafts.

In Fig. 6 I have indicated at 100 a bearing housing which may be of any desired type and part of any form of mechanism. This housing includes a transverse wall 101 having an aperture 102 therein through which a shaft 103 extends. The shaft 103 includes a reduced portion 104 which forms a shoulder 105 and is threaded as at 106 and includes a further reduced portion 107.

Positioned on the reduced portion 104 of the shaft I provide a plurality of collars 108 shown as three in number, although the number may be varied. The collars are retained in spaced relation by sleeves 109. The collar 108 adjacent the housing wall 101 abuts the shaft shoulder 105 and the collars and sleeves are retained in a fixed position by a plurality of lock nuts 110 positioned on the threaded portion 106 of the shaft and engage the collar 108 farthest removed from the housing wall 101.

Each of the collars 108 is shown as forming one raceway for anti-friction bearings 112 preferably of the roller bearing type. The other raceway of the bearings 112 associated with the first two collars nearest the housing wall 101 is formed by rings 113 and 114.

The rings 113 include an outer angular face 115 which is arranged at an angle of approximately 28° to the horizontal and which is adapted to be engaged by similarly arranged inner faces 116 of a plurality of segmental members 117 which are similar to the segmental members 45 of the device 10. The segments 117 engage the wall 101 and have their outer faces arranged at an angle of approximately 45° to the horizontal as indicated at 118.

The ring 114 includes an outer angular face 119 which is arranged at an angle of approximately 45° to the horizontal and which is adapted to be engaged by similarly arranged inner faces 120 of a plurality of segmental members 121 which also include outer angular faces 122 arranged at an angle of approximately 45° to the horizontal.

The segments 121 are adapted to engage a transverse face 123 of a floating collar 124 which surrounds the first collar 108 and includes an angular face 125 which is arranged at an angle of approximately 45° to the horizontal and engages the outer angular faces 118 of the segments 117.

Surrounding the second collar 108 I provide another floating collar 126 similar in all respects to the collar 124 and the angular face 125' of which engages the angular faces 122 of the segments 121 and the transverse face 123 of which forms the other raceway of the bearing 112 associated with the collar 108 farthest removed from the housing wall 101.

When a pressure is exerted on the shaft 103 in the direction indicated by the arrow in Fig. 6 this pressure is transferred through the collars 108 to the bearings 112.

The bearing adjacent the lock nuts 110 transfers the pressure to the floating collar 126 which by means of its angular face 125' tends to force the segments 121 inward but as the ring 114 is also under pressure the angular face 119 thereof tends to force the segments 121 outward. The pressure on the segments 121 is transferred to the floating collar 124, the angular face 125 of which tends to force the segments 117 inward but as the ring 113 is also under pressure the angular face 115 thereof tends to force the segments 117 outward.

The outer angular face 115 of the ring 113 and the inner angular faces 116 of the segments are formed at a different angle from that of the outer faces 118 of the segments to compensate for the difference in the pressures exerted on the segments by the bracket 124 and the ring 113. That is, the pressure exerted on the ring 113 by the bracket 124 is preferably approximately twice that exerted by the ring 113 so that the angle of the engaging faces of the segments and the ring have to be arranged so that mechanical advantages thereof will compensate for this difference in pressure and thereby tend to equalize or distribute the shaft pressure on all the bearings.

In Fig. 7 I have indicated a bearing housing generally at 128 which includes a transverse wall 129 having an aperture 130 therein through which a shaft 131 extends. This shaft is similar to the shaft 103 in Fig. 6 and includes a reduced portion 132 which forms a shoulder 133 and is threaded as at 134 and includes a further reduced portion 135.

Positioned on the reduced portion 132 of the shaft I provide a plurality of collars 136, 137, 138 and 139, which are retained in spaced relation by sleeves 140. The collar 136 adjacent the housing wall 129 abuts the shaft shoulder 133 and the collars and sleeves are retained in a fixed position by a plurality of lock nuts 141 which are positioned on the threaded portion 134 of the shaft and engage the collar 139.

Associated with the collars 136, 137, 138 and 139 I provide suitable antifriction bearings 142, 143, 144 and 145 respectively, and the collars form one raceway for their associated bearings. The other raceway of the bearing 142 is formed by a ring 146 and the other raceway for the bearing 144 is formed by a ring 147. The other raceway of the bearing 143 is formed by a transverse face 148 of a floating collar 149 and the other raceway of the bearing 145 is formed by a transverse face 150 of a floating collar 151.

The ring 146 includes an outer angular face 152 which is arranged at an angle of approximately 45° to the horizontal and which is adapted to be engaged by similarly arranged faces 153 of a plurality of segmental members 154. The segments 154 include outer angular faces 155 arranged at approximately 45° to the horizontal which engage a similarly shaped angular face 156 of the floating collar 149. The segments 154 engage a plane face 158 of a ring 159 which includes an angular face 160 arranged at approximately 45° to the horizontal which is adapted to engage similarly shaped inner angular faces 161 of a plurality of segmental members 162.

The segments 162 engage the housing wall 129 and include outer angular faces 163 arranged at approximately 45° to the horizontal which are adapted to engage a similarly shaped face 164 of a bracket 165. The ring 147 includes an angular face 166 likewise arranged at approximately 45° to the horizontal and which is engaged by similarly shaped faces 167 of a plurality of segmental members 168. The segments 168 include outer angular faces 169 arranged at approximately 45° to the horizontal which are engaged by a similarly shaped face 170 of the floating collar 151 and the segments 168 engage a plane face 171 of the bracket 165.

When pressure is exerted on the shaft 131 in the direction indicated by the arrow in Fig. 7, the rings, segments and brackets act to equalize and distribute the pressure exerted on the various bearings in the same manner as previously described in connection with the first two bearing arrangements.

In Fig. 8 I have indicated generally at 175 a bearing assembly which comprises a combination of the elements shown in Figs. 6 and 7. That is, in the device of Fig. 8 the portion indicated at 180 corresponds to the bearing housing 128 and associated parts while the portion indicated at 181 corresponds to the parts within the housing 100. These two portions are within a housing 182 and wherein the rings, segments, and brackets act to equalize the pressure exerted on the various bearings in the same manner as described in connection with the other devices.

By using various combinations of the arrangements shown in Figs. 5 and 6 any number of antifriction bearings may be used to form a thrust bearing unit.

Having thus described my invention, what I claim is:

1. In combination with a shaft, a member surrounding said shaft, an antifriction bearing including spaced raceways surrounding said shaft, means whereby one of said raceways is connected to said shaft, a ring surrounding said shaft, said other raceway engaging said ring, said ring including an inclined outer face, a plurality of independent, spaced, circumferentially arranged segmental members surrounding said shaft and supported by a portion of said member, said segments including inner and outer inclined faces, said inner inclined faces of said segments engaging said outer inclined face of said ring, a second ring surrounding said first ring, said second ring including an inner inclined face engaging said outer inclined faces of said segments, a floating collar surrounding said shaft, said floating collar being supported on said second ring and means to connect said floating collar to said shaft.

2. In combination with a shaft including a housing, an anti-friction bearing including spaced raceways surrounding said shaft, one of said raceways engaging said shaft, a second antifriction bearing surrounding said shaft and including spaced raceways, one of said second antifriction bearing raceways engaging said shaft, means connecting the other raceways of said first and second antifriction bearings, a third antifriction bearing surrounding said shaft and including spaced raceways, means to support one of said third bearing raceways on said shaft, a bearing block surrounding said shaft and secured to a portion of said housing and adapted to be engaged by the other raceway of said third bearing, said first and second antifriction bearings being adapted to support said shaft when the weight thereof is on said housing and said third antifriction bearing being adapted to support said housing when the weight thereof is on said shaft.

3. In combination with a shaft, a support, an enlarged flange on said shaft, an antifriction bearing surrounding said shaft, a portion of said bearing engaging said flange, a ring surrounding said shaft, another portion of said bearing engaging said ring, said ring including an inclined face, a plurality of independent, spaced, circumferentially arranged segmental members surrounding said shaft, said segmental members engaging said support, said segments having inner inclined faces engaging said inclined face of said ring, said segments having outer inclined faces, a second ring, said second ring including an inclined face, said outer inclined faces of said segments engaging said inclined face of said second ring, a floating collar, said collar engaging said second ring, a second antifriction bearing surrounding said shaft, a portion of said second bearing engaging said collar, a second enlarged flange on said shaft, another portion of said second bearing engaging said second flange.

4. A swivel, said swivel including a housing, a shaft journaled in said housing, an enlarged flange on said shaft, an antifriction bearing including an upper and a lower raceway surrounding said shaft, said upper raceway engaging said flange, a ring surrounding said shaft, said lower raceway engaging said ring, said ring including an inclined outer face, a plurality of segmental members surrounding said shaft and supported by a portion of said housing, said segments including inner and outer inclined faces, said inner inclined faces of said segments engaging said outer inclined face of said ring, a second ring surrounding said first ring, said second ring including an inner inclined face adapted to engage said outer inclined faces of said segments, a floating collar surrounding said shaft, said floating collar being supported on said second ring, means to prevent rotation of said floating collar relative to said housing, a second antifriction bearing surrounding said shaft and including an upper and a lower raceway, said lower raceway engaging said bracket, an enlarged collar surrounding said shaft, means to secure said enlarged collar to said shaft, said upper raceway of said second bearing engaging said enlarged collar, a third antifriction bearing surrounding said shaft and including an upper and a lower raceway, means to support said last mentioned lower raceway on said shaft, a bearing block surrounding said shaft and secured to a portion of said housing and adapted to be engaged by said upper raceway of said third bearing, said first and second antifriction bearings being adapted to support said shaft when the weight thereof is on said housing and said third antifriction bearing being adapted to support said housing when the weight thereof is on said shaft.

5. A swivel, said swivel comprising a housing having a bail thereon by which it is adapted to be suspended, a plurality of bearing members in said housing, a hollow shaft journaled in said bearings, a goose neck secured to said housing, a hollow sleeve secured to said goose neck and extending into said hollow shaft, a packing gland associated with said shaft and surrounding said sleeve, an enlarged flange on said shaft, an antifriction bearing including an upper and a lower raceway surrounding said shaft, said upper raceway engaging said flange, a ring surrounding said shaft, said lower raceway engaging said ring, said ring including an inclined outer face, a plurality of segmental members surrounding said shaft and supported by a portion of said housing, said segments including inner and outer inclined faces, said inner inclined faces of said segments engaging said outer inclined face of said ring, a second ring surrounding said first ring, said second ring including an inner inclined face adapted to engage said outer inclined faces of said segments, a floating collar surrounding said shaft, said floating collar being supported on said second ring, means to prevent rotation of said floating collar relative to said housing, a second antifriction bearing surrounding said shaft and including an upper and a lower raceway, said lower raceway engaging said floating collar, an enlarged collar surrounding said shaft, means to secure said enlarged collar to said shaft, said upper raceway of said second bearing engaging said enlarged collar, said first and second antifriction bearings being adapted to support said shaft when the weight thereof is on said housing.

6. A swivel including a housing, a floating collar keyed within said housing for longitudinal movement along the housing, a shaft in the housing, an anti-friction bearing engaging said shaft, a ring engaging said bearing, said ring having an inclined face, segmental members slidable within said housing and having inclined faces engaging said ring, said segmental members having other inclined faces engaging said collar, a second anti-friction member engaging said shaft and means whereby said second anti-friction member is supported by said collar.

In testimony whereof, I hereunto affix my signature.

RAY W. BARRETT.